US011715962B2

(12) United States Patent
Mori et al.

(10) Patent No.: US 11,715,962 B2
(45) Date of Patent: Aug. 1, 2023

(54) CHARGING DEVICE, CHARGING METHOD, AND CHARGING SYSTEM

(71) Applicant: SONY CORPORATION, Tokyo (JP)

(72) Inventors: Naoto Mori, Tokyo (JP); Daisuke Morizono, Aichi (JP); Noriaki Takagi, Kanagawa (JP); Myungjin Jung, Kanagawa (JP); Chikashi Yajima, Kanagawa (JP); Hidenori Ishibashi, Tokyo (JP); Takuma Araki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 556 days.

(21) Appl. No.: 16/755,990

(22) PCT Filed: Aug. 21, 2018

(86) PCT No.: PCT/JP2018/030716
§ 371 (c)(1),
(2) Date: Apr. 14, 2020

(87) PCT Pub. No.: WO2019/087529
PCT Pub. Date: May 9, 2019

(65) Prior Publication Data
US 2020/0298399 A1   Sep. 24, 2020

(30) Foreign Application Priority Data
Oct. 31, 2017   (JP) .................................. 2017-210785

(51) Int. Cl.
*H02J 7/00* (2006.01)
*B60L 53/35* (2019.01)
(Continued)

(52) U.S. Cl.
CPC ........... *H02J 7/0042* (2013.01); *B25J 9/0003* (2013.01); *B25J 19/021* (2013.01); *B60L 53/31* (2019.02);
(Continued)

(58) Field of Classification Search
CPC ...... H02J 7/0042; H02J 7/0044; H02J 7/0045; B25J 9/123; B25J 9/0003; B25J 9/06;
(Continued)

(56) References Cited

U.S. PATENT DOCUMENTS 6,764,373 B1 *  7/2004  Osawa ................. G05D 1/0234
                                                              446/454
2004/0012362 A1   1/2004  Tsurumi
(Continued)

FOREIGN PATENT DOCUMENTS

CN          1493247 A       5/2004
CN          1605963 A       4/2005
(Continued)

OTHER PUBLICATIONS

International Search Report and Written Opinion of PCT Application No. PCT/JP2018/030716, dated Oct. 2, 2018, 10 pages of ISRWO.
(Continued)

*Primary Examiner* — Edward Tso
*Assistant Examiner* — Aaron Piggush
(74) *Attorney, Agent, or Firm* — Chip Law Group

(57) ABSTRACT

To reliably connect a device to be charged such as a robot and a charging device. There is provided a charging device including a charging stand having a charging terminal to be connected to a device to be charged and an engaging portion that performs positioning with the device to be charged, and a support member that supports the charging stand movably in the horizontal direction. With this configuration, the charging stand can be moved in the horizontal direction. Therefore, it is possible to reliably connect the device to be charged such as a robot and the charging device.

19 Claims, 20 Drawing Sheets

(51) Int. Cl.
  *B25J 9/00*   (2006.01)
  *B25J 19/02*  (2006.01)
  *B60L 53/31*  (2019.01)
  *B25J 9/06*       (2006.01)

(52) U.S. Cl.
  CPC ............ *B60L 53/35* (2019.02); *H02J 7/0044* (2013.01); *B25J 9/06* (2013.01); *H02J 7/0045* (2013.01)

(58) Field of Classification Search
  CPC ......... B25J 19/021; B60L 53/30; B60L 53/31; B60L 53/35; A63H 30/00; G05D 1/0234
  USPC .............................. 320/104, 107, 109; 191/2
  See application file for complete search history.

(56) References Cited

U.S. PATENT DOCUMENTS

| | | |
|---|---|---|
| 2004/0088081 A1 | 5/2004 | Song et al. |
| 2005/0182515 A1 | 8/2005 | Tsurumi |
| 2005/0182516 A1 | 8/2005 | Tsurumi |
| 2005/0182517 A1 | 8/2005 | Tsurumi |
| 2005/0189899 A1 | 9/2005 | Tsurumi |
| 2005/0194921 A1 | 9/2005 | Tsurumi |
| 2008/0042620 A1* | 2/2008 | Udono .................. H02J 7/0045 320/137 |
| 2015/0270729 A1* | 9/2015 | Isobe ...................... B60L 53/18 320/107 |
| 2016/0370804 A1* | 12/2016 | Suh ........................... H02J 7/00 |
| 2018/0001777 A1 | 1/2018 | Kilic |
| 2019/0181666 A1* | 6/2019 | Hayashi .................. B60L 53/36 |

FOREIGN PATENT DOCUMENTS

| | | |
|---|---|---|
| CN | 105785988 A | 7/2016 |
| CN | 107000605 A | 8/2017 |
| DE | 10319512 A1 | 5/2004 |
| DE | 102009001080 A1 | 8/2010 |
| DE | 102014226357 A1 | 6/2016 |
| EP | 3104489 A1 | 12/2016 |
| FR | 2846587 A1 | 5/2004 |
| GB | 2394796 A | 5/2004 |
| JP | 2001-125641 A | 5/2001 |
| JP | 2003-079062 A | 3/2003 |
| JP | 2004-066381 A | 3/2004 |
| JP | 3886128 B2 | 2/2007 |
| JP | 4032793 B2 | 1/2008 |
| JP | 2013-141341 A | 7/2013 |
| JP | 2014-184529 A | 10/2014 |
| KR | 10-2004-0039094 A | 5/2004 |
| KR | 101607671 B1 | 3/2016 |
| RU | 2240915 C1 | 11/2004 |
| SE | 523915 C2 | 6/2004 |
| WO | 2010/094517 A2 | 8/2010 |
| WO | 2016/009619 A1 | 1/2016 |
| WO | 2016/096194 A1 | 6/2016 |
| WO | 2016/114463 A1 | 7/2016 |

OTHER PUBLICATIONS

Extended European Search Report of EP Application No. 18872384.5, dated Aug. 31, 2020, 07 pages.

\* cited by examiner

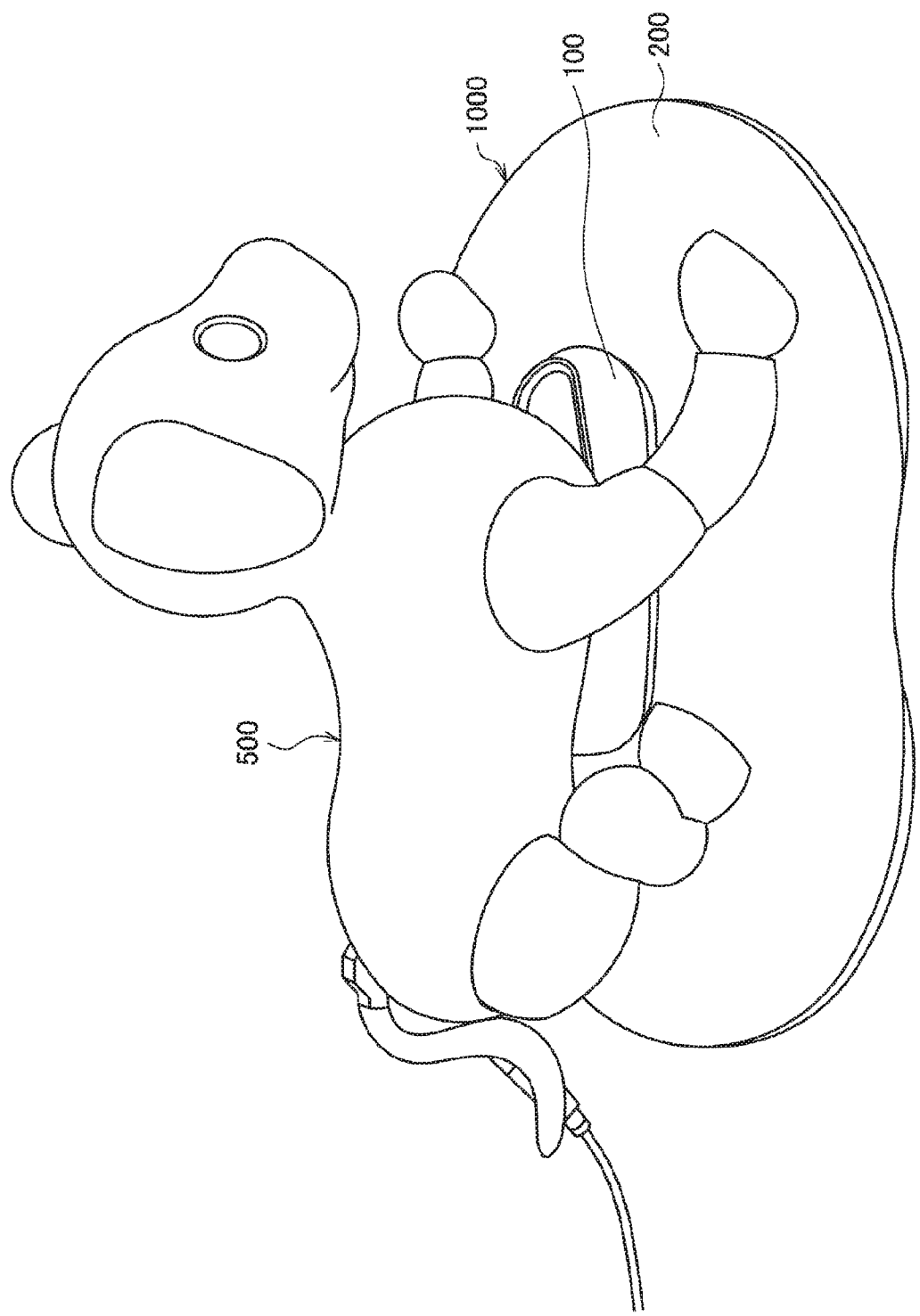

CHARGING DEVICE, CHARGING METHOD, AND CHARGING SYSTEM

CROSS REFERENCE TO RELATED APPLICATIONS

This application is a U.S. National Phase of International Patent Application No. PCT/JP2018/030716 filed on Aug. 21, 2018, which claims priority benefit of Japanese Patent Application No. JP 2017-210785 filed in the Japan Patent Office on Oct. 31, 2017. Each of the above-referenced applications is hereby incorporated herein by reference in its entirety.

TECHNICAL FIELD

The present disclosure relates to a charging device, a charging method, and a charging system.

BACKGROUND ART

Patent Document 1 below conventionally discloses a robot device capable of not only walking on four legs but also standing on two hind legs.

CITATION LIST

Patent Document

Patent Document 1: JP 2004-66381 A

SUMMARY OF THE INVENTION

Problems to be Solved by the Invention

An electric robot device needs to be appropriately charged. On the other hand, in a method of charging the robot device by connecting a power line thereto, there is a problem that a user needs to perform a complicated operation to connect the power line to the robot.

In addition, in a case where it is assumed that the robot device is connected to a charging station for charging, it is difficult to accurately align the robot device with the charging station.

Therefore, it has been required to reliably connect a device to be charged such as a robot and a charging device.

Solutions to Problems

According to the present disclosure, there is provided a charging device including: a charging stand having a charging terminal to be connected to a device to be charged and an engaging portion that performs positioning with the device to be charged; and a support member that supports the charging stand movably in the horizontal direction.

In addition, according to the present disclosure, there is provided a charging method in a charging device including a charging stand having a charging terminal to be connected to a device to be charged and an engaging portion that performs positioning with the device to be charged, and a support member that supports the charging stand movably in the horizontal direction, the charging method including: positioning the device to be charged on the charging stand; and electrically connecting the charging terminal and a terminal of the device to be charged by lowering the device to be charged.

In addition, according to the present disclosure, there is provided a charging system including: a movable device to be charged; and a charging device including a charging stand having a charging terminal to be connected to a device to be charged and an engaging portion that performs positioning with the device to be charged, and a support member that supports the charging stand movably in the horizontal direction.

Effects of the Invention

According to the present disclosure, it is possible to reliably connect a device to be charged such as a robot and a charging device.

Note that the above effect is not necessarily limiting, and in conjunction with or in place of the above effect, any of the effects shown in the present specification, or other effects that may be understood from the present specification, may be achieved.

BRIEF DESCRIPTION OF DRAWINGS

FIG. 4B is a schematic view illustrating the robot riding on the charging station and self-charging.

MODE FOR CARRYING OUT THE INVENTION

Hereinafter, preferred embodiments of the present disclosure will be described in detail with reference to the accompanying drawings. Note that, in the present specification and drawings, components having substantially the same functional configuration are denoted by the same reference signs, and redundant description thereof is omitted.

Note that the description will be made in the following order.

Figure 1:
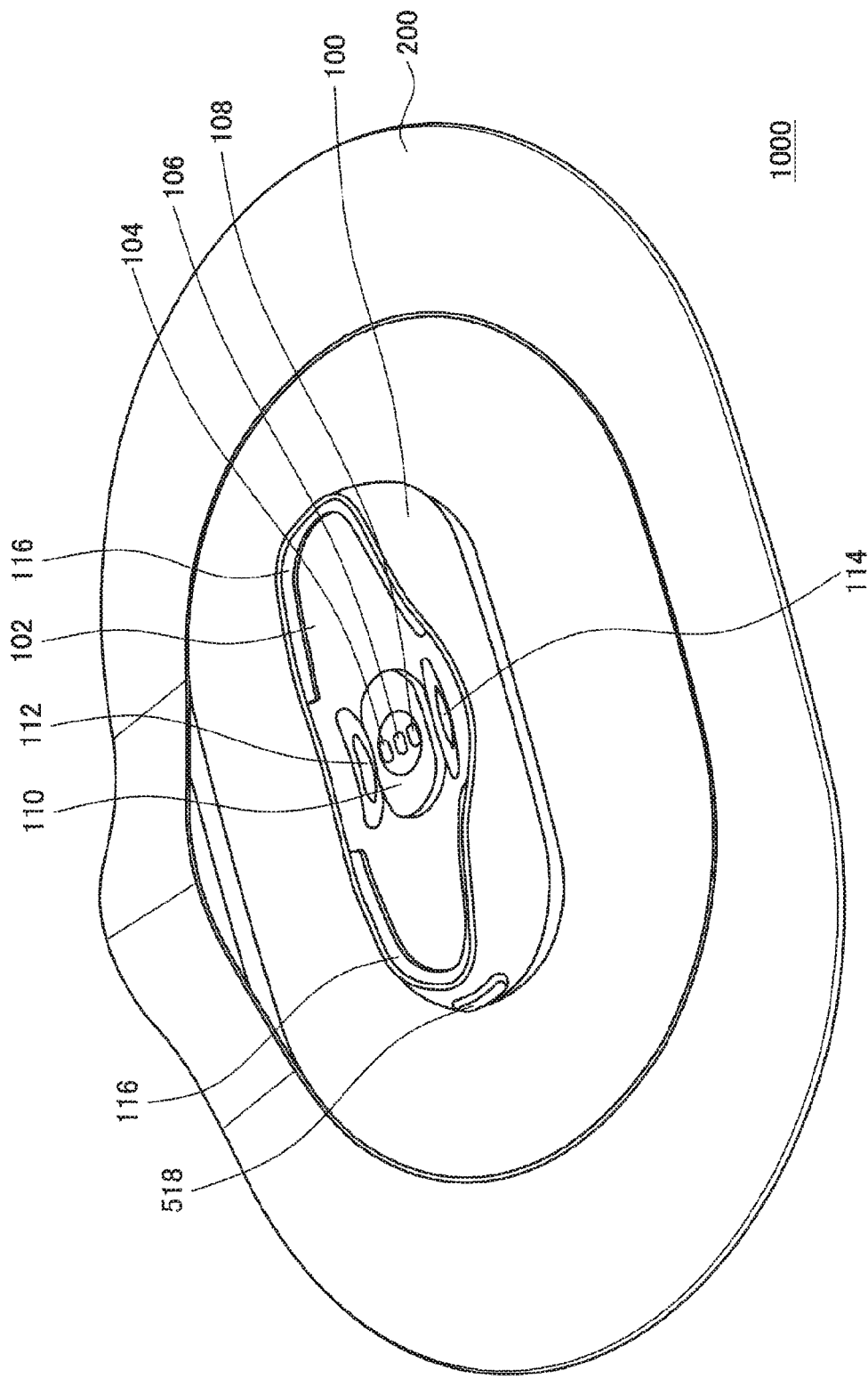
FIG. 1 is a schematic view illustrating an appearance of a charging station according to an embodiment of the present disclosure.
Figure 2:
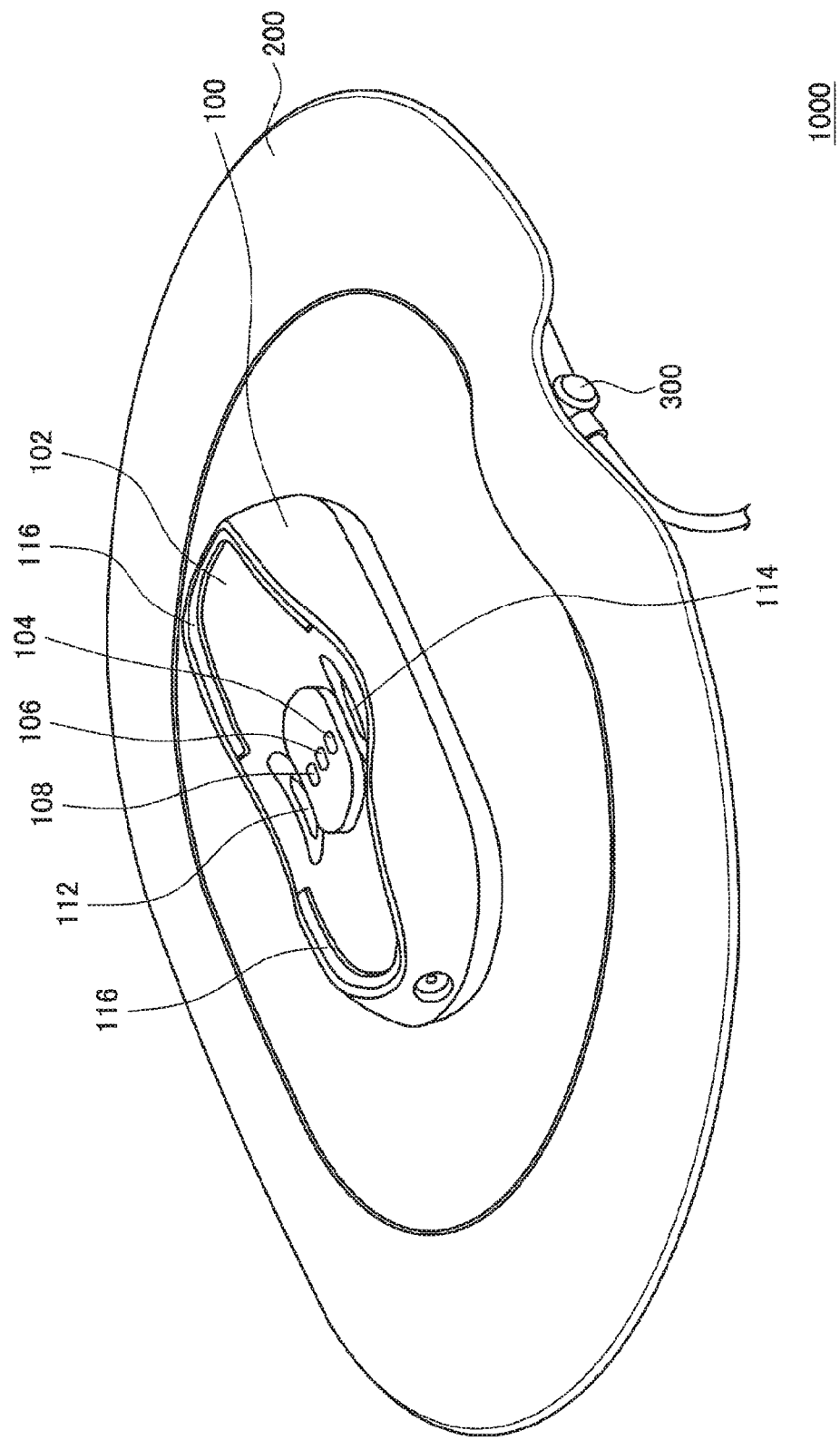
FIG. 2 is a schematic view illustrating the appearance of the charging station according to the embodiment of the present disclosure.

1. Appearance of Charging Device
2. Appearance of Robot
3. Example of Self-Charging Posture
4. Connection between Charging Station and Robot
5. Configurations of Charging Stand and Charging Mat 1. Appearance of Charging Device FIGS. 1 and 2 are schematic views illustrating an appearance of a charging station 1000 according to an embodiment of the present disclosure. The charging station 1000 is configured to enable a robot 500 to perform self-charging. As illustrated in FIGS. 1 and 2, the charging station 1000 includes a charging stand 100 and a charging mat (support member) 200. As illustrated in FIG. 2, power is supplied to the charging station 1000 by insertion of an AC adapter plug 300 into the charging mat 200.

2. Appearance of Robot

Figure 3:
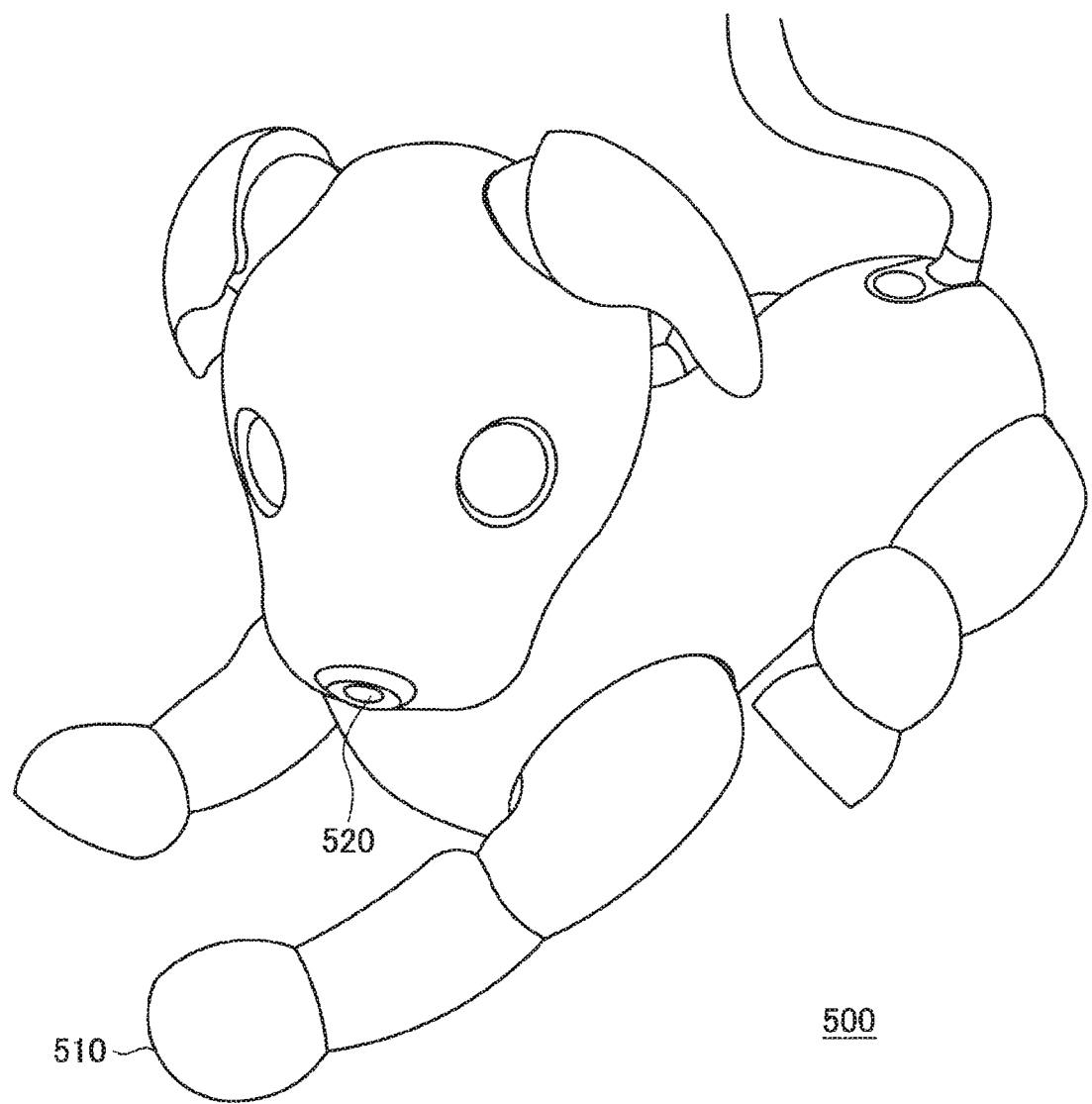
FIG. 3 is a schematic view illustrating a robot to be charged by the charging station.

FIG. 3 is a schematic view illustrating the robot (device to be charged) 500 to be charged by the charging station 1000. In the present embodiment, the robot 500 is a dog-shaped robot, and can move around freely by walking on four legs. For this reason, on a joint of the leg of the robot 500, an actuator that drives the joint is mounted. The robot 500 is appropriately charged to drive the actuator. By recognizing the charging station 1000, and moving to a position of the charging stand station 1000 to contact the charging stand 100, the robot 500 can perform charging on its own will (hereinafter also referred to as self-charging).

3. Example of Self-Charging Posture

Figure 4A:
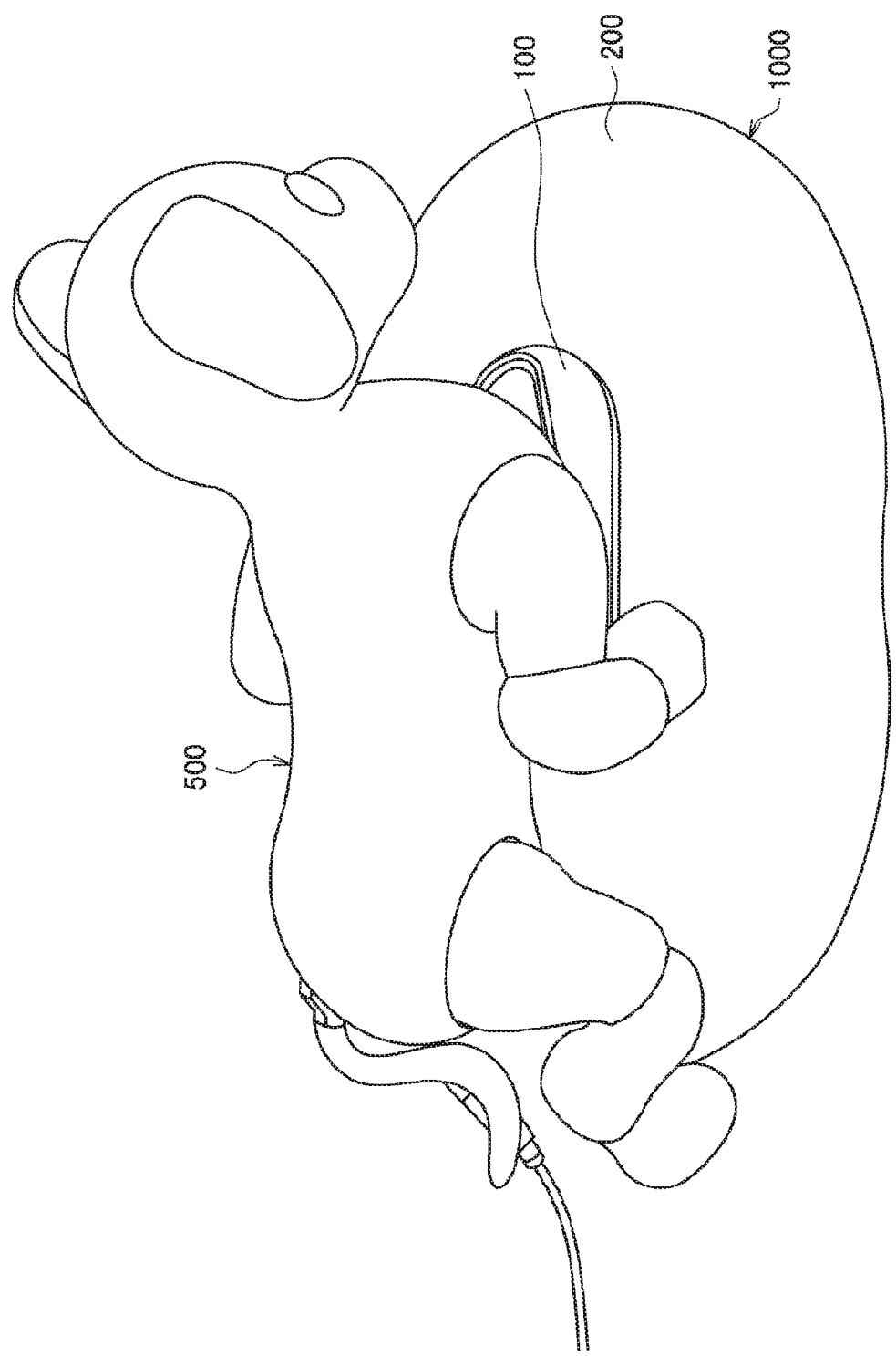
FIG. 4A is a schematic view illustrating the robot riding on the charging station and self-charging.

FIGS. 4A and 4B are schematic views illustrating the robot 500 riding on the charging station 1000 and self-charging. Examples of the posture in which the robot 500 performs charging include a "dive" posture illustrated in FIG. 4A and a "sitting" posture illustrated in FIG. 4B. In both postures, charging is performed when a connection terminal on the robot 500 side contacts a connection terminal on the charging stand 100 side.

In normal charging, charging is performed in the "sitting" posture illustrated in FIG. 4B. On the other hand, in a case where a charge amount of the robot 500 is extremely small, for example, the robot 500 quickly rides on the charging station 1000 and dives onto the charging stand 100 for charging. In a case where such a dive operation is performed, self-charging is performed in the posture illustrated in FIG. 4A.

4. Connection Between Charging Station and Robot

Figure 5:
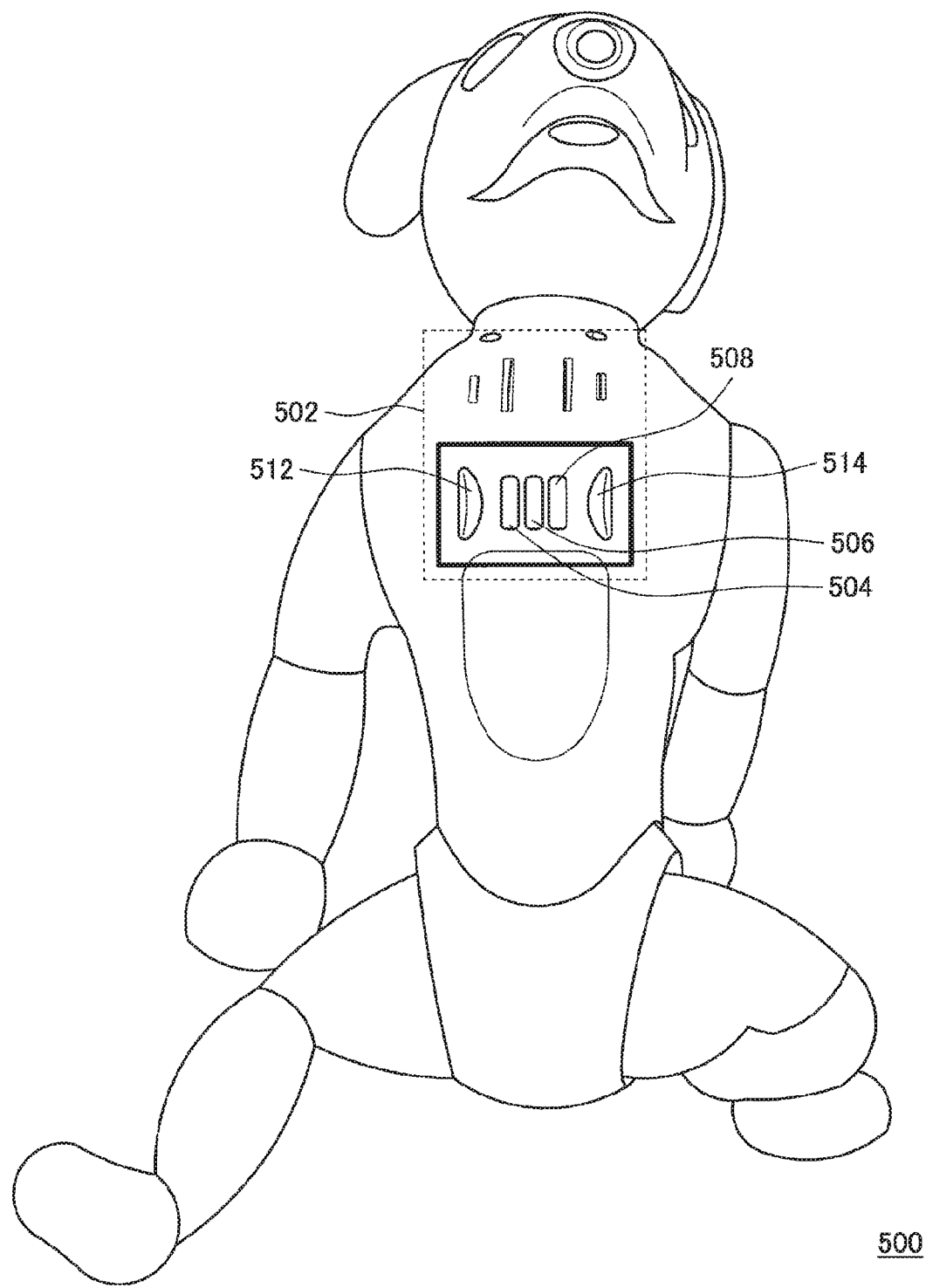
FIG. 5 is a schematic view illustrating a fitting surface provided on a belly of the robot.

As illustrated in FIGS. 1 and 2, the charging stand 100 has a curved fitting surface 102 that matches the shape of a fitting surface 502 of the robot 500 so that the charging stand 100 can be fitted with the robot 500. The fitting surface 502 on the robot 500 side is provided on a belly portion of the robot 500. FIG. 5 is a schematic view illustrating the fitting surface 502 provided on the belly of the robot 500. In addition, FIG. 6 is an enlarged schematic view illustrating the fitting surface 502 and its periphery of the robot 500.

The charging stand 100 of the charging station 1000 is provided with charging terminals 104, 106, and 108 so as to be surrounded by the fitting surface 102. When the robot 500 performs charging, the charging terminals 104, 106, and 108 are connected to charging terminals 504, 506, and 508 on the robot side illustrated in FIGS. 5 and 6.

A terminal protection plate 110 is provided to protect the charging terminals 104, 106, and 108. The charging terminals 104, 106, and 108 are protected by the terminal protection plate 110 in a case where the robot 500 is not charging. When the robot 500 sits down and the fitting surface 502 and the fitting surface 102 are brought into close contact with each other, the terminal protection plate 110 is lowered by the weight of the robot 500, so that the charging terminals 104, 106, and 108 appear. In addition, in a case where the robot 500 is not charging, that is, in a case where the fitting surface 502 and the fitting surface 102 are not in close contact with each other, the terminal protection plate 110 is pushed upward by a compression coil spring. With this arrangement, the upper surfaces of the charging terminals 104, 106, and 108 become lower than the upper surface of the terminal protection plate 110, so that the charging terminals 104, 106, and 108 can be protected.

Figure 6:
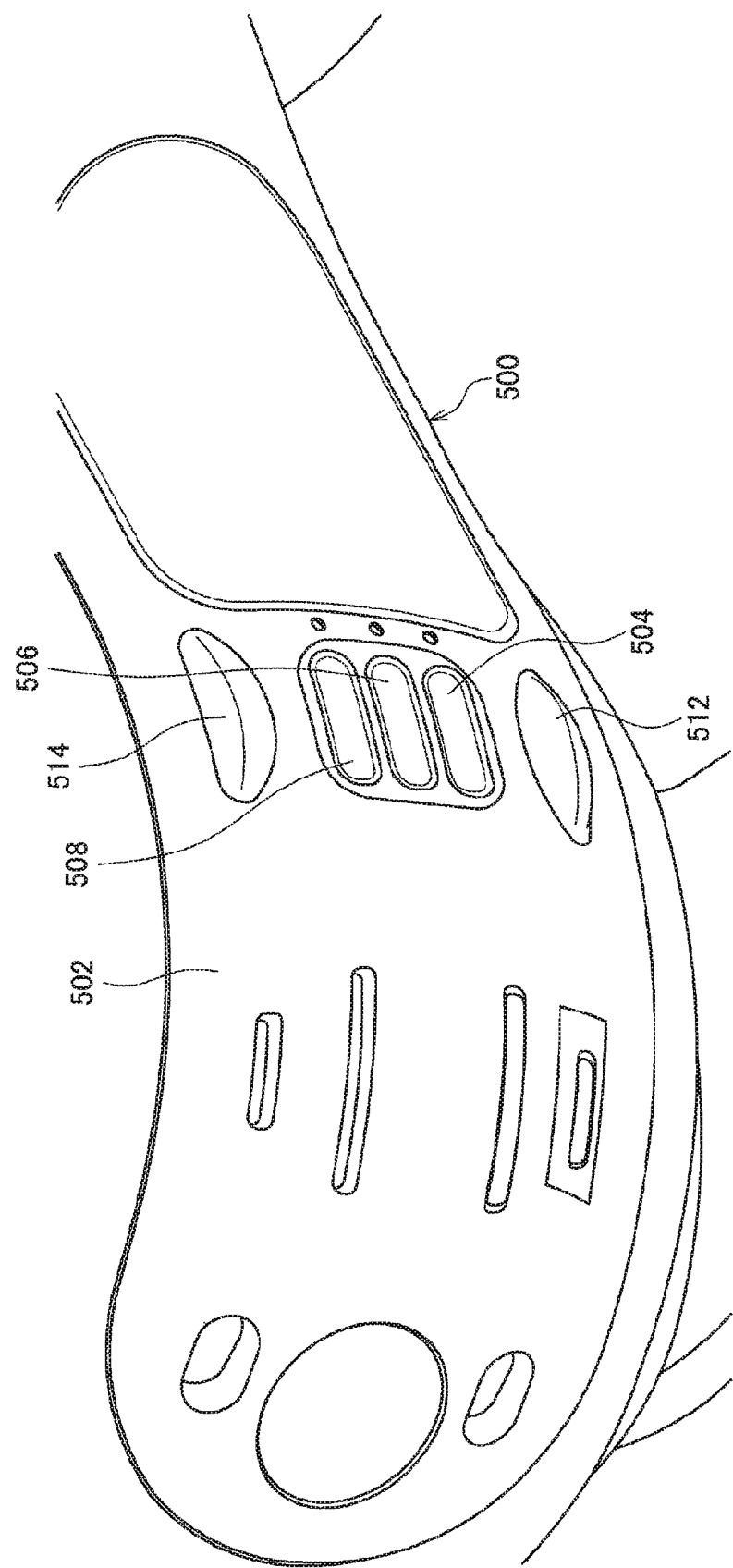
FIG. 6 is an enlarged schematic view illustrating the fitting surface and its periphery of the robot.

As illustrated in FIG. 6, positioning protrusions (engaging portions) 512 and 514 are provided on the fitting surface 502 of the robot 500. In addition, as illustrated in FIGS. 1 and 2, the charging stand 100 is provided with positioning recesses 112 and 114 corresponding to the positioning protrusions 512 and 514, respectively. A positional relationship between the positioning protrusions 512 and 514 and the charging terminals 504, 506, and 508 on the fitting surface 502 is similar to a positional relationship between the positioning recesses 112 and 114 and the charging terminals 104, 106, and 108 on the fitting surface 102.

When the robot 500 sits down on the charging stand 100, the positioning protrusions 512 and 514 illustrated in FIG. 6 are pressed onto the fitting surface 102. The positioning protrusions 512 and 514 on the robot side are fitted into the positioning recesses 112 and 114 of the charging stand 100, so that the charging terminals 104, 106, and 108 on the charging stand 100 side can be joined to the charging terminals 504, 506, and 508 on the robot 500 side.

Figure 7:
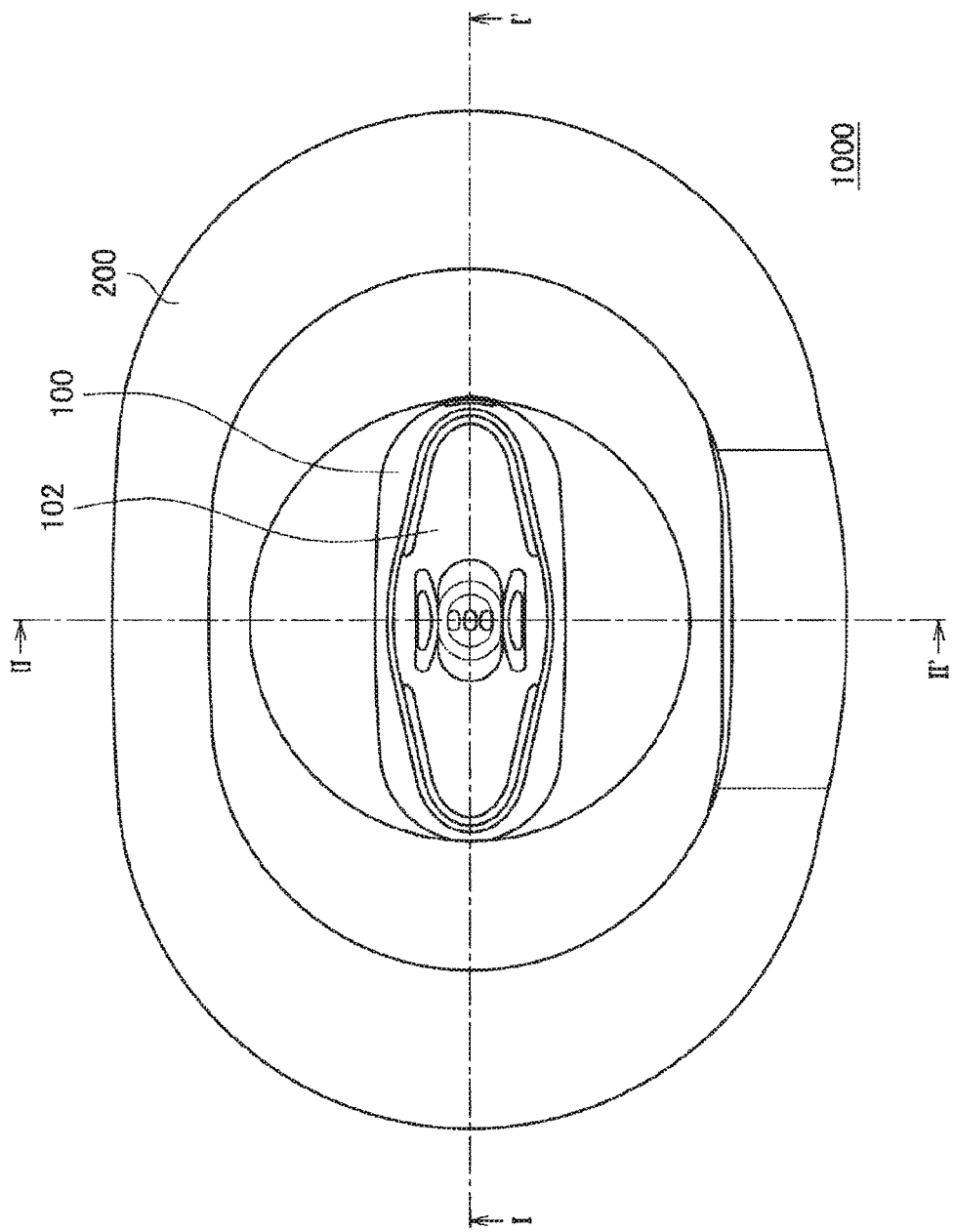
FIG. 7 is a schematic view for describing how the fitting surface of the robot and a fitting surface of a charging stand fit together.
Figure 8:
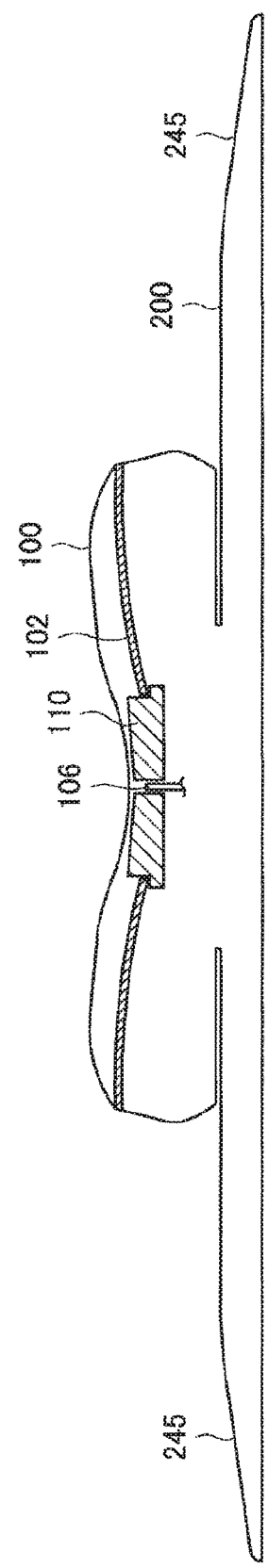
FIG. 8 is a schematic view for describing how the fitting surface of the robot and the fitting surface of the charging stand fit together.

FIGS. 7 to 10 are schematic views for describing how the fitting surface 502 of the robot 500 and the fitting surface 102 of the charging stand 100 fit together. FIG. 7 is a plan view of the charging station 1000 as viewed from above. FIG. 8 schematically illustrates a cross section taken along a one-dot chain line I-I' in FIG. 7.

Figure 9:
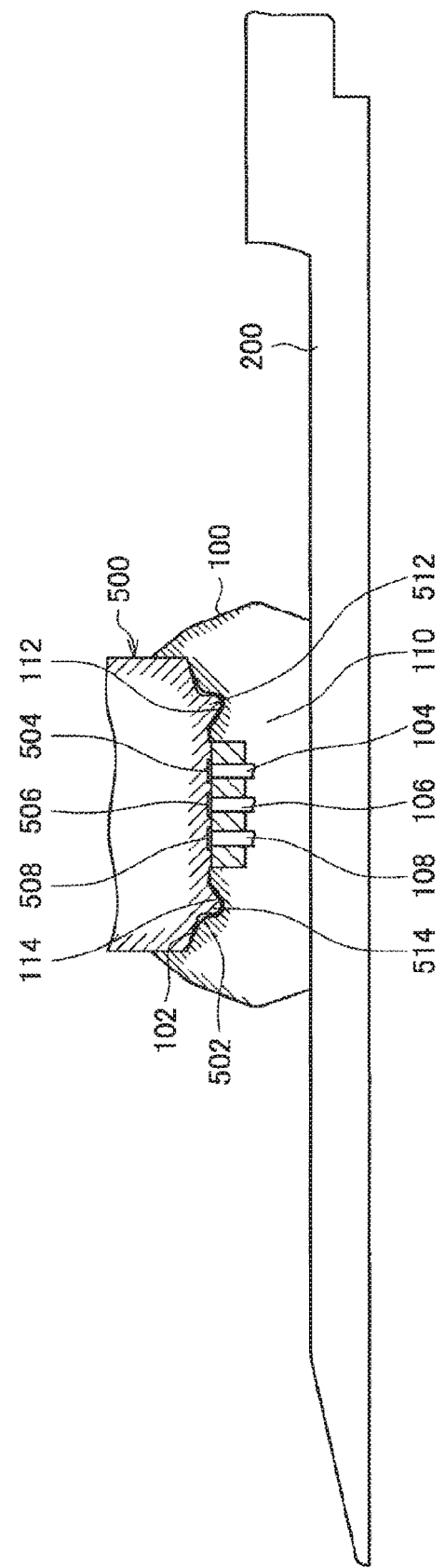
FIG. 9 is a schematic view for describing how the fitting surface of the robot and the fitting surface of the charging stand fit together.

In addition, FIG. 9 schematically illustrates a cross section taken along a one-dot chain line II-II' in FIG. 7, and illustrates, together with the charging station 1000, a cross section of the robot 500 in the vicinity of the fitting surface 502. More specifically, FIG. 9 illustrates the fitting surface 102 of the charging stand 100 and the fitting surface 502 of the robot 500 in a state of being in close contact with each other, and the positioning protrusions 512 and 514 in a state of being fitted into the positioning recesses 112 and 114.

Figure 10:
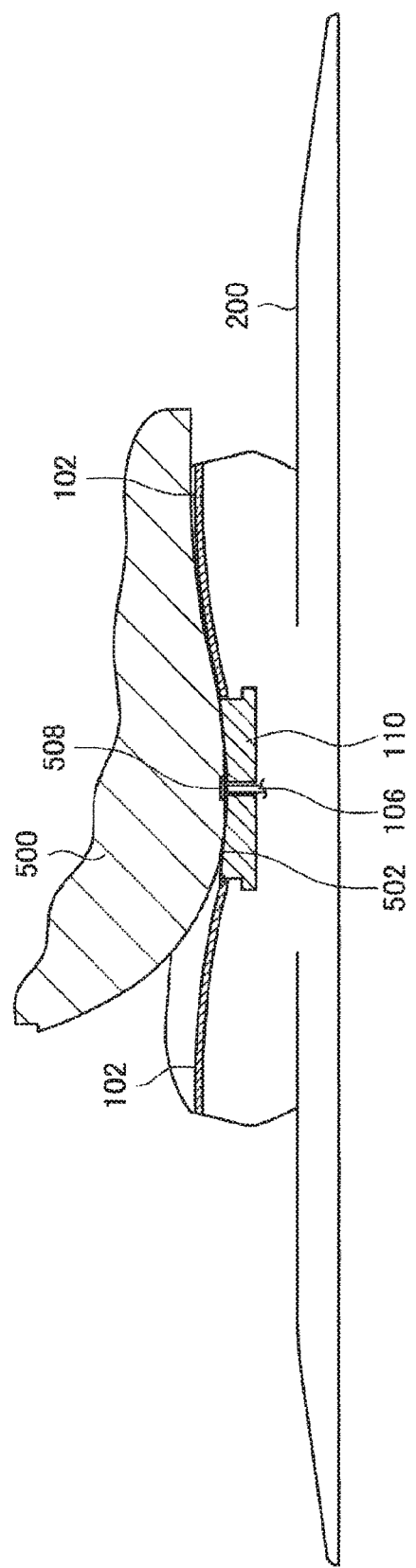
FIG. 10 is a schematic view for describing how the fitting surface of the robot and a fitting surface of a charging stand fit together.

In addition, FIG. 10 schematically illustrates a cross section taken along the one-dot chain line I-I' in FIG. 7, and illustrates, together with the charging station 1000, a cross section of the robot 500 in the vicinity of the fitting surface 502. More specifically, FIG. 10 illustrates the fitting surface 502 of the robot 500 in a state of being fitted into the fitting surface 102 of the charging stand 100.

As illustrated in FIGS. 8 to 10, the fitting surface 102 of the charging stand 100 includes a concave curved surface in both the cross section taken along the one-dot chain line I-I' and the cross section taken along the one-dot chain line II-II'. The fitting surface 502 of the robot 500 includes a curved surface having the shape corresponding to the shape of the fitting surface 102 of the charging stand 100, and includes a convex curved surface in both the cross section taken along the one-dot chain line I-I' and the cross section taken along the one-dot chain line II-II'.

By forming the concave surface of the fitting surface 102 and the convex surface of the fitting surface 502 as the curved surfaces corresponding to each other, when the fitting surface 502 contacts the fitting surface 102, positions of the fitting surface 102 and the fitting surface 502 match, and the fitting surface 102 and the fitting surface 502 are fitted to each other. With this arrangement, the positioning protrusions 512 and 514 can be fitted into the positioning recesses 112 and 114. At this time, in the present embodiment, the charging stand 100 is moved in the horizontal direction so that the positioning protrusions 512 and 514 and the positioning recesses 112 and 114 are reliably fitted. A mechanism that moves the charging stand 100 in the horizontal direction will be described later in detail.

As described above, as illustrated in FIG. 8, in a state where the fitting surface 502 is not in contact with the fitting surface 102, the upper surface of the terminal protection plate 110 is positioned higher than the upper surface of the charging terminal 106. Thus, the charging terminals 104, 106, and 108 are protected by the terminal protection plate 110. On the other hand, as illustrated in FIGS. 9 and 10, when the robot 500 sits down and the fitting surface 502 and the fitting surface 102 are brought into close contact with each other, the terminal protection plate 110 is lowered by the weight of the robot 500, so that the charging terminals 104, 106, and 108 appear. With this arrangement, the charging terminals 104, 106, and 108 and the charging terminals 504, 506, and 508 are electrically connected.

5. Configurations of Charging Stand and Charging Mat

Figure 11:
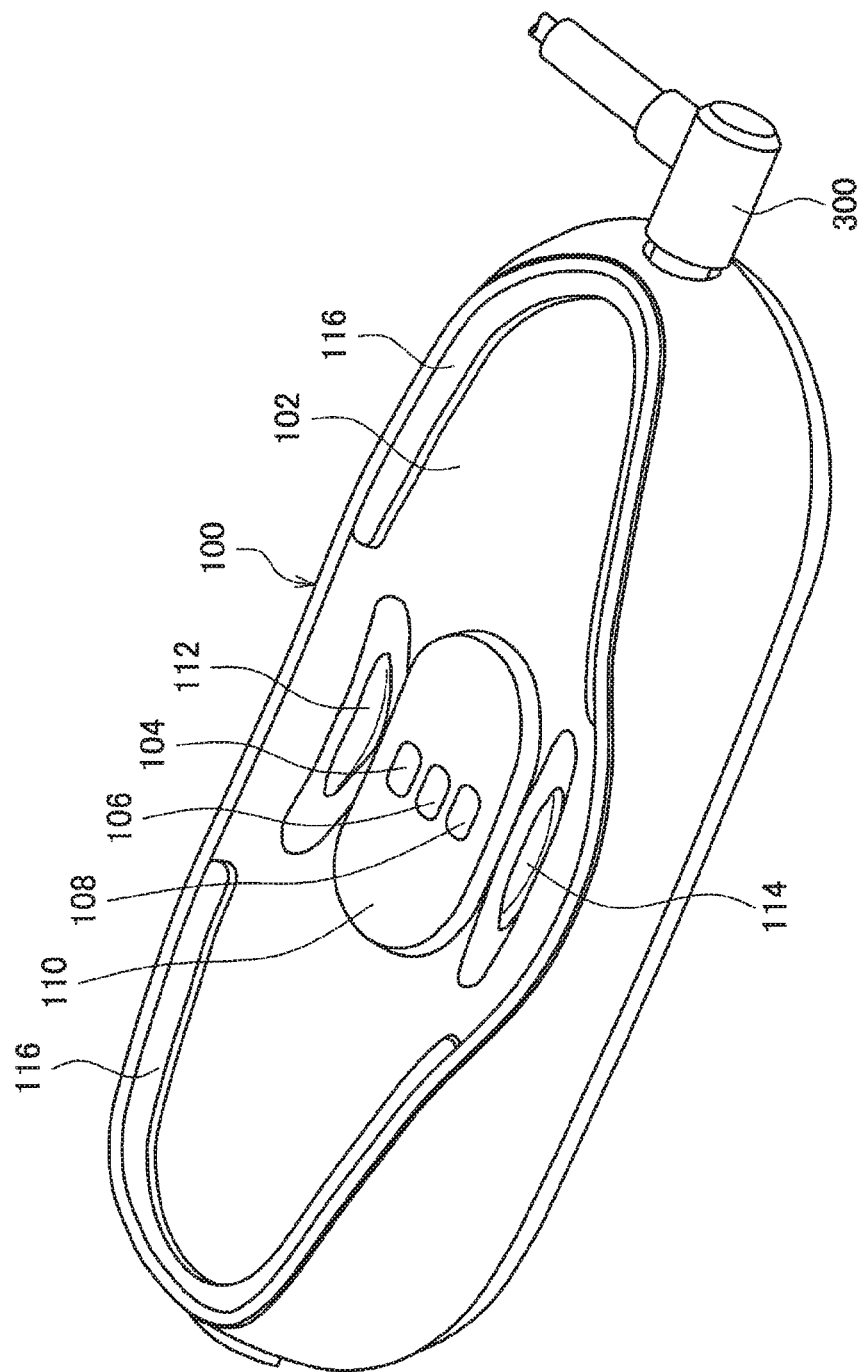
FIG. 11 is a schematic view illustrating the charging stand removed from a charging mat.

The charging stand 100 can be removed from the charging mat 200. A user can remove the charging stand 100 from the charging mat 200 by pressing a release button 518 illustrated in FIG. 1. FIG. 11 is a schematic view illustrating the charging stand 100 removed from the charging mat 200. As illustrated in FIG. 11, by removing the charging stand 100 from the charging mat 200, the charging stand 100 can be used as a portable charging stand. With this arrangement, a user can charge the robot 500 even at a place of visit or the like, for example, by carrying only the charging stand 100 without carrying the charging mat 200. In the state where the charging stand 100 is removed from the charging mat 200, power can be supplied by insertion of the AC adapter plug 300 into the charging stand 100, as illustrated in FIG. 11.

As illustrated in FIG. 11, cushions 116 are provided on an outer edge of the fitting surface 102. The cushions 116 have a function of preventing a surface of the robot 500 from being scratched or damaged by sliding, and improving slidability of the fitting surface 502 on the fitting surface 102, in a case where the robot 500 sits down on the charging stand 100.

Figure 12:
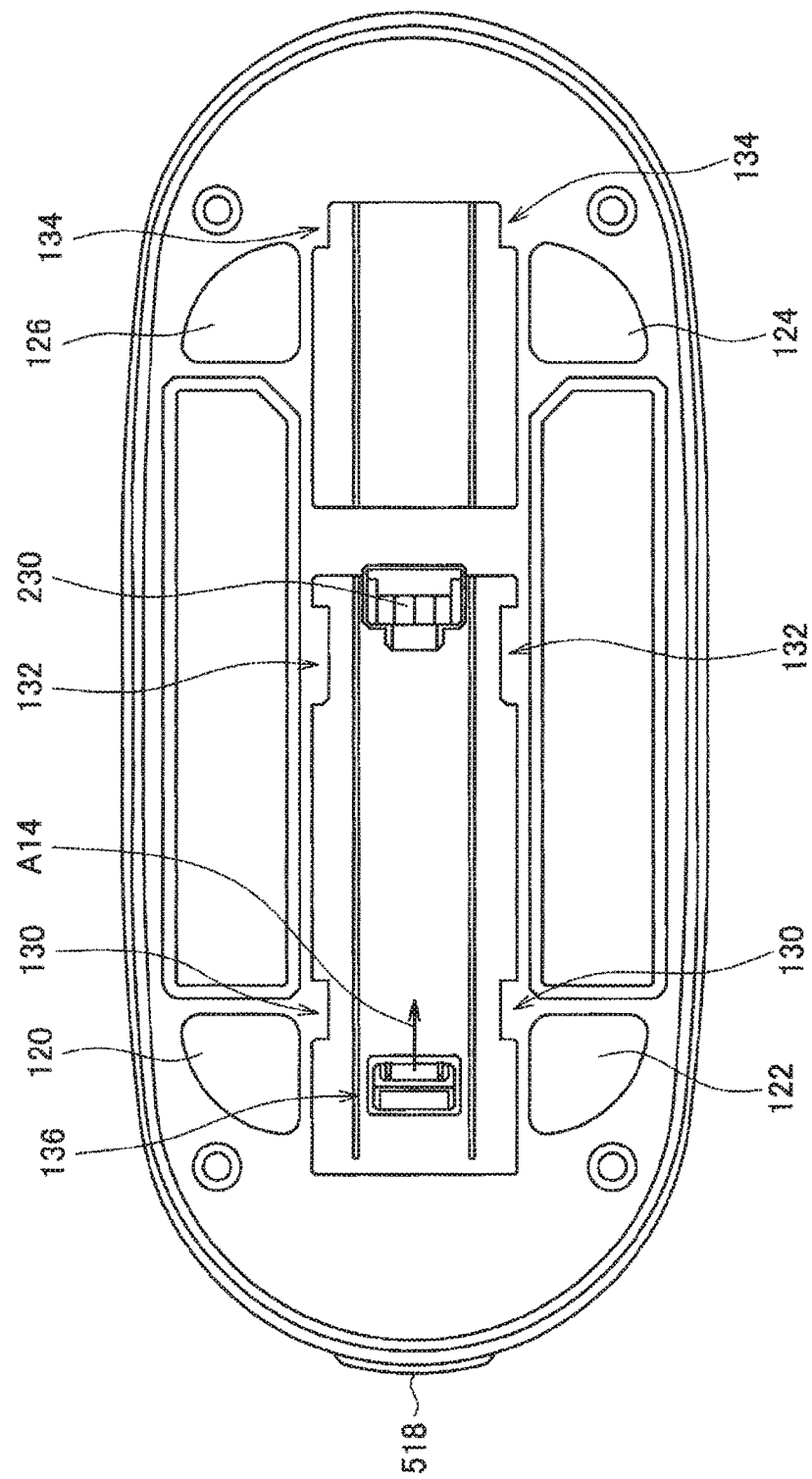
FIG. 12 is a schematic view illustrating the bottom surface of the charging stand.

FIG. 12 is a schematic view illustrating the bottom surface of the charging stand 100. Rubber feet 120, 122, 124, and 126 having a non-slip function are provided on the bottom surface of the charging stand 100. In a case where the charging stand 100 is used as a portable charging stand, the charging stand 100 is fixed to the floor surface by the rubber feet 120, 122, 124, and 126.

Figure 13:
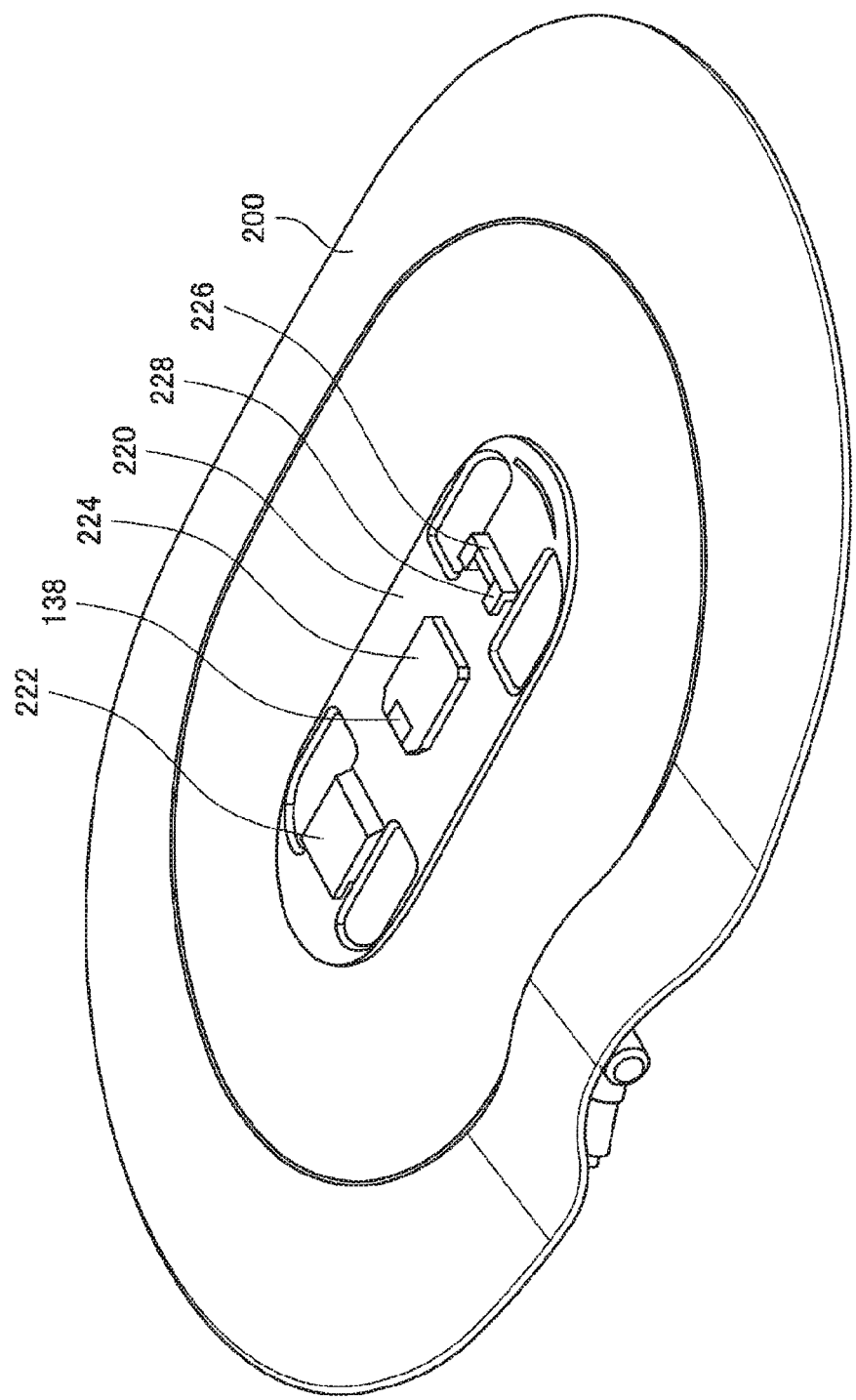
FIG. 13 is a schematic view illustrating the charging mat with the charging stand removed.

FIG. 13 is a schematic view illustrating the charging mat 200 with the charging stand 100 removed. The charging mat 200 is provided with a charging stand installation plate 220, which enables the charging stand 100 to be attached in a single operation in a case where the charging stand 100 is attached to the charging mat 200. For this reason, the charging stand installation plate 220 of the charging mat 200 is provided with rail portions 222, 224, and 226 and a lock portion 228. The lock portion 228 moves in the direction of an arrow A11 when the release button 518 is pressed, and is biased in the direction opposite to the direction of the arrow A11 by a spring (not illustrated) in a state where the release button 518 is not pressed.

As illustrated in FIG. 12, slide protrusions 130, 132, and 134 are provided on the bottom surface of the charging stand 100. The slide protrusions 130, 132, and 134 of the charging stand 100 move along the rail portions 222, 224, and 226 of the charging mat 200 illustrated in FIG. 13, and a lock claw 136 of the charging stand 100 engages with the lock portion 228 of the charging mat 200, whereby the charging stand 100 is fixed to the charging mat 200. More specifically, the slide protrusions 134 are hooked to the hook shape at an end of the rail portion 222, and the lock claw 136 of the charging stand 100 is hooked to the rail portion 226 in this state, whereby the charging stand 100 is fixed to the charging mat 200. When the lock claw 136 moves in the direction of an arrow A14 in FIG. 12, the lock claw 136 and the rail portion 226 are disengaged, and the charging stand 100 can be removed from the charging mat 200. When the charging stand 100 is fixed to the charging mat 200, a charging mat connection terminal 230 illustrated in FIG. 12 and a charging stand connection terminal 138 illustrated in FIG. 13 contact each other. With this arrangement, the charging stand 100 and the charging mat 200 are electrically connected.

Figure 14:
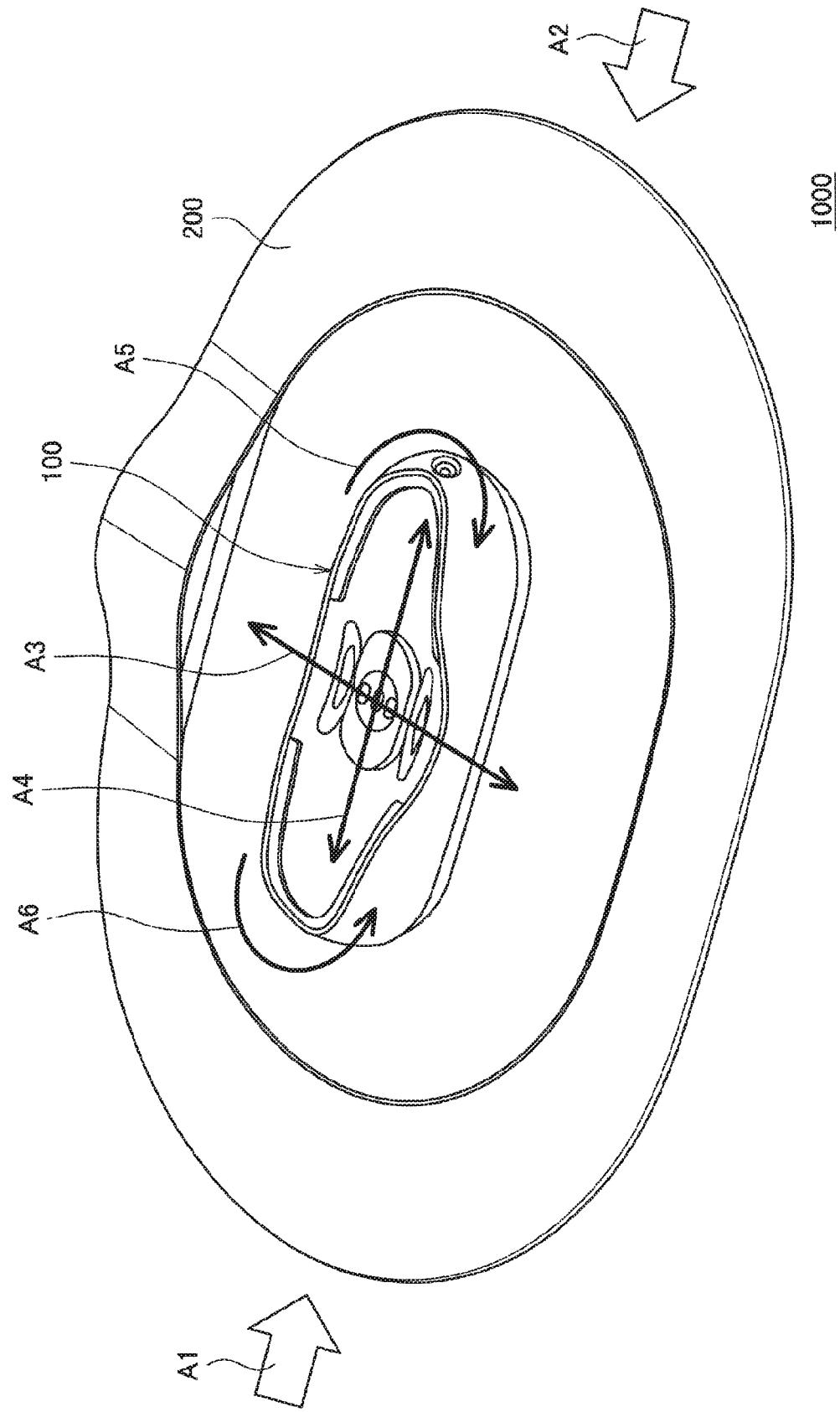
FIG. 14 is a schematic view for describing horizontal movement of the charging stand.

FIG. 14 is a schematic view for describing horizontal movement of the charging stand 100. Basically, the robot 500 can approach the charging stand 100 from an access direction A1 or an access direction A2 illustrated in FIG. 14, and can be connected to the charging stand 100.

As illustrated in FIG. 14, the charging stand 100 can move on the charging mat 200 in a transverse direction A3 or a longitudinal direction A4 (the same direction as the access directions A1 and A2) with respect to the access directions A1 and A2, and can also rotate in rotation directions A5 and A6. Furthermore, the charging stand 100 is capable of movement in which movement in the transverse direction A3, the longitudinal direction A4, and the rotation directions A5 and A6 are combined.

Figure 15:
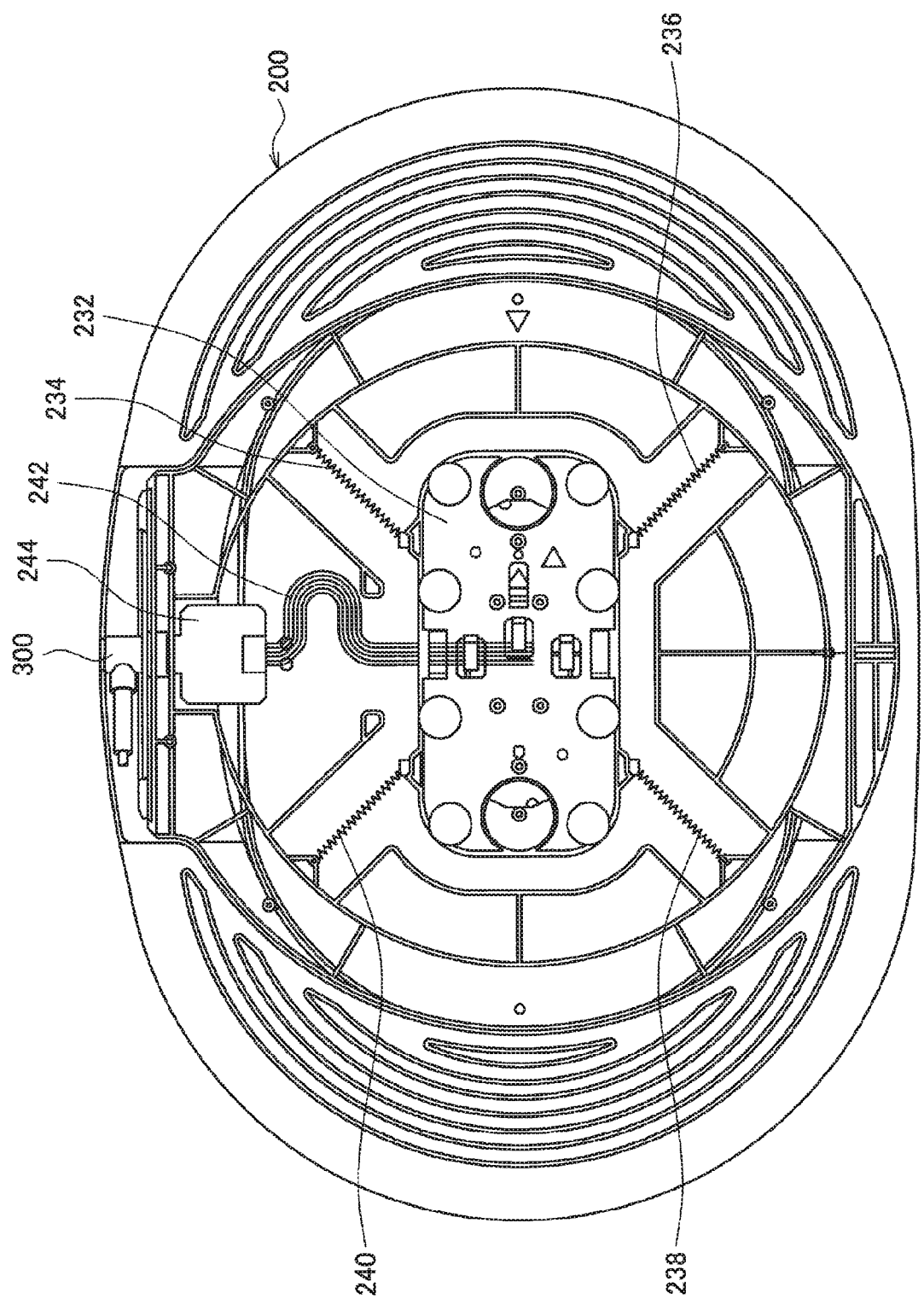
FIG. 15 is a schematic view illustrating a mechanism of a movable part that enables movement in a transverse direction A3, a longitudinal direction A4, and rotation directions A5 and A6 illustrated in FIG. 14.

FIG. 15 is a schematic view illustrating a mechanism of a movable part that enables movement in the transverse direction A3, the longitudinal direction A4, and the rotation directions A5 and A6 illustrated in FIG. 14, and schematically illustrates the charging mat 200 as viewed from the back surface. As illustrated in FIG. 15, the charging mat 200 is provided with a slider 232, springs (tensile springs) 234, 236, 238, and 240, a harness 242, and a connection substrate 244. The slider 232 is fastened to the charging stand installation plate 220 illustrated in FIG. 13. The slider 232 is supported by the four springs 234, 236, 238, and 240 and can be freely moved by expansion and contraction of the springs 234, 236, 238, and 240. This arrangement enables movement in the transverse direction A3, the longitudinal direction A4, and the rotation directions A5 and A6 illustrated in FIG. 14.

Power is supplied to the robot 500 by connecting the AC adapter plug 300 illustrated in FIG. 15 from an AC adapter to the connection substrate 244. The connection substrate 244 and the charging stand connection terminal 138 illustrated in FIG. 13 are electrically connected via the harness 242, and when the charging stand 100 is mounted on the charging mat 200, the charging stand connection terminal 138 and the charging mat connection terminal 230 illustrated in FIG. 12 are electrically connected. Thus, power is supplied to the charging stand 100 via the connection substrate 244, the harness 242, the charging stand connection terminal 138, and the charging mat connection terminal 230. The charging terminals 104, 106, and 108 illustrated in FIG. 1 are electrically connected to the charging terminals 504, 506, and 508 on the robot side illustrated in FIG. 5, whereby the power supplied to the charging stand 100 is supplied to the robot 500.

The charging station 1000 has a degree of freedom of the charging stand 100 in the transverse direction A3, the longitudinal direction A4, and the rotation directions A5 and A6 illustrated in FIG. 14. Thus, in a case where the robot 500 accesses the charging stand 100, the charging stand 100 can correct an approach angle and a positional deviation at the time of sitting. When the fitting surface 502 of the robot 500 and the fitting surface 102 of the charging stand 100 are fit, the charging stand 100 itself moves, so that it is possible to passively align the charging stand 100 with the robot 500.

More specifically, when the fitting surface 502 and the fitting surface 102 are fit, in a case where positions of the positioning protrusions 512 and 514 do not match positions of the positioning recesses 112 and 114, the positioning protrusions 512 and 514 are pressed onto the fitting surface 102 by the weight of the robot 500. At this time, since the positioning protrusions 512 and 514 are pressed onto a slope of the concave surface of the fitting surface 102, the charging stand 100 that received a reaction force from the slope moves in the horizontal direction by expansion and contraction of the springs 234, 236, 238, and 240. With this arrangement, in accordance with the concave curved surface of the fitting surface 102, the positioning protrusions 512 and 514 are fitted into the positioning recesses 112 and 114 at the lowest positions of the concave curved surface.

Furthermore, even in a case where the robot 500 fails to have a good positional relationship with the charging stand 100 when the robot 500 approaches the charging stand 100 and paws of the robot 500 interfere with the charging stand 100, the charging stand 100 can retreat since the charging stand 100 has the degree of freedom in the transverse direction A3, the longitudinal direction A4, and the rotation directions A5 and A6 illustrated in FIG. 14, and thus a sitting motion can be performed without hindering movement of the robot 500.

Examples of another function of the charging mat 200 include a function of preventing interference between a cord for supplying power to the charging stand 100 and the robot 500. In a case where the robot 500 accesses the charging stand 100, the cord for supplying power to the charging stand 100 is covered with the charging mat 200. With this arrangement, the cord for supplying power and the like does not hinder the robot 500 from accessing the charging stand 100.

The robot 500 recognizes the charging station 1000 on the basis of the color and the shape of the charging station 1000. In addition, the robot 500 recognizes an approach direction and a distance from the charging stand 100 on the basis of the shape of the charging stand 100. For this reason, the robot 500 includes a camera 520 for recognizing the color, the shape, and the like of the charging stand 100 and the charging mat 200. The robot 500 can recognize the color and the shape of the charging station 1000 on the basis of an image captured by the camera 520, and can control a walking direction, a posture, and the like on the basis of a recognition result.

In a case where the robot 500 performs self-charging, the robot 500 recognizes the charging station 1000 and approaches the charging station 1000. When the robot 500 approaches the charging station 1000, the robot 500 recognizes the shape of the charging stand 100, goes up a slope 245 illustrated in FIG. 8 from the longer direction of the charging stand 100 (the direction of the arrow A1 or the arrow A2 illustrated in FIG. 14), and rides on the charging mat 200, so as to take the "dive" or "sitting" posture described with reference to FIGS. 4A and 4B.

At this time, by providing the charging mat 200, conditions in a case where the robot 500 accesses the charging stand 100, for example, a state of the floor surface, the color of the floor surface, exclusion of obstacles, and the like can be made constant. In other words, the state of the floor surface around the charging stand 100 and the color of the floor surface are uniformed by a state of the upper surface of the charging mat 200 and the color of the charging mat 200. In addition, by providing the charging mat 200, obstacles are inevitably excluded from around the charging stand 100.

Therefore, according to the charging station 1000 of the present embodiment, conditions in a case where the robot 500 accesses the charging stand 100 can be kept constant regardless of varieties of the color and a state of the floor surface on which the robot 500 walks, so that self-charging can be reliably performed.

In a case where the robot 500 fails to sit down on the charging stand 100, the robot 500 can finely adjust its position on the charging stand 100 by activating a correction motion. In the correction motion, the robot 500 performs an operation in which the robot 500 moves minutely to the front, back, left, and right, or vibrates. By the activation of the correction motion, the fitting surface 502 on the bottom of the robot slides along the fitting surface 102 of the charging stand 100, and the positioning protrusions 512 and 514 are fitted into the positioning recesses 112 and 114 illustrated in FIG. 1, whereby the charging stand 100 moves to a desired position. Thus, it is possible to perform fine adjustment for correcting positional deviation.

Figure 16:
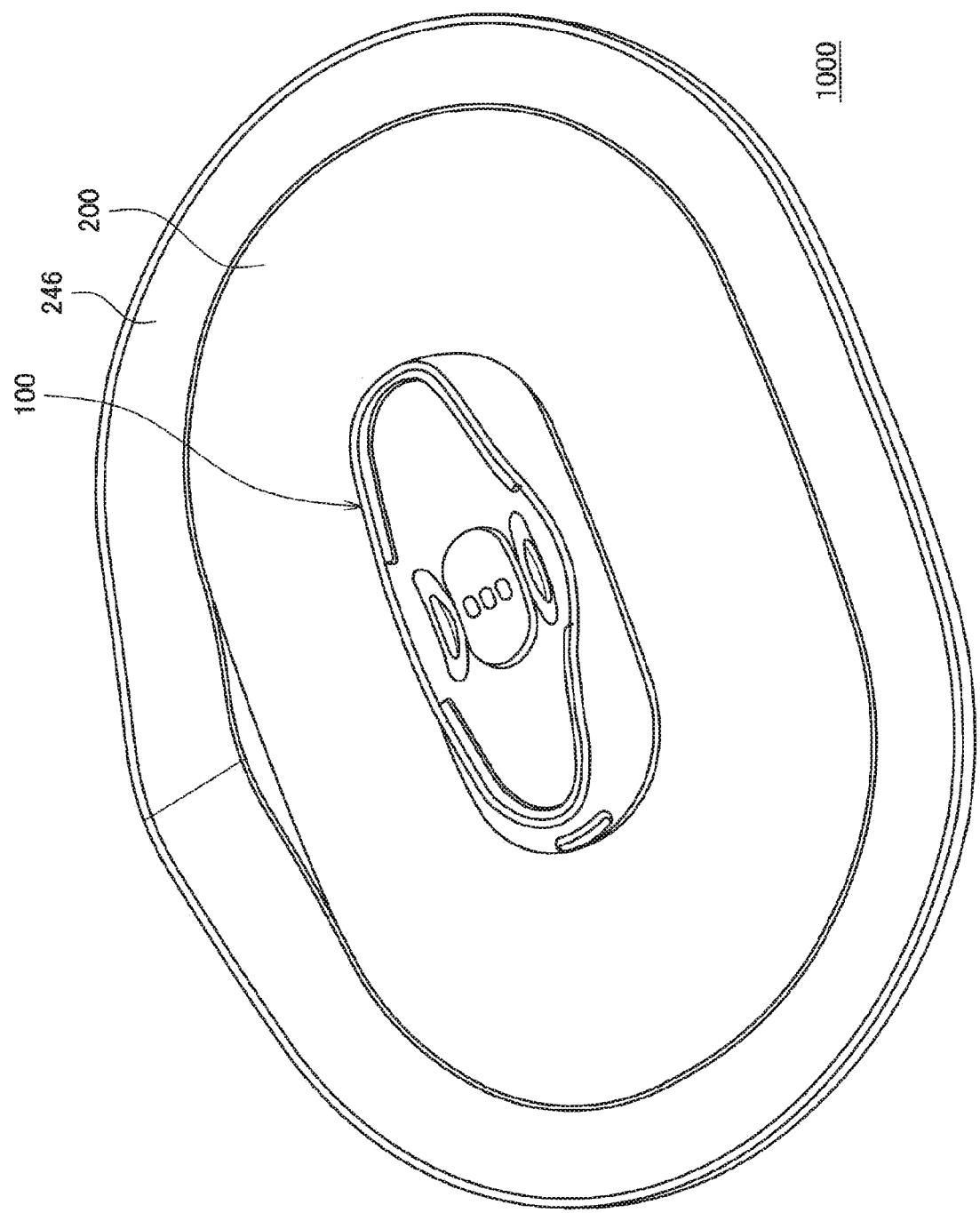
FIG. 16 is a schematic view illustrating an example in which a groove having the shape similar to the shape of the bottom of a paw of the robot is provided along an edge of the charging mat.
Figure 17:
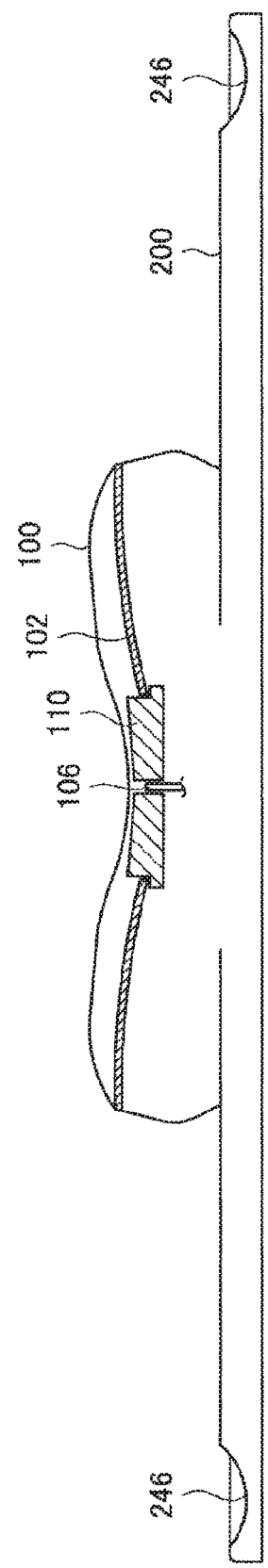
FIG. 17 is a schematic view illustrating a cross section of the charging station illustrated in FIG. 16 taken along a line similar to a one-dot chain line I-I' in FIG. 7.

FIG. 16 is a schematic view illustrating an example in which a groove 246 having the shape similar to the shape of the bottom of a paw 510 of the robot 500 is provided along an edge of the charging mat 200. In addition, FIG. 17 is a schematic view illustrating a cross section of the charging station 1000 illustrated in FIG. 16 taken along a line similar to the one-dot chain line I-I' in FIG. 7. By providing the groove 246, it is possible to prevent the paw 510 of the robot 500 from sliding off the charging mat 200. Furthermore, since the groove 246 having the same shape as the paw 510 is provided along the edge of the charging mat 200, both front paws of the robot 500 fit into the groove 246, and the robot 500 can be automatically directed toward the charging stand 100.

Figure 18A:
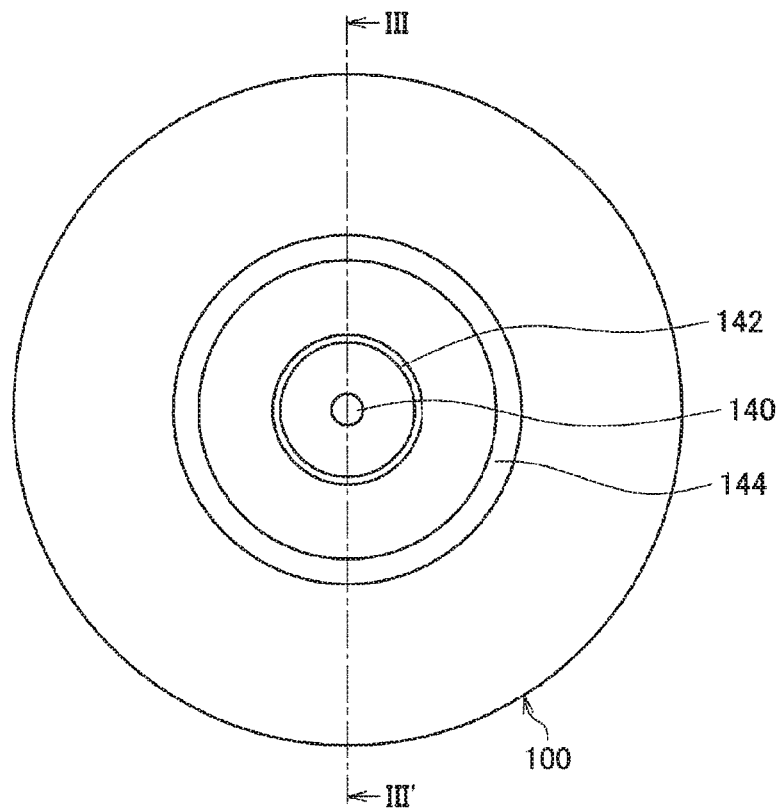
FIG. 18A is a schematic view illustrating the charging stand having a circular planar shape.

The shape of the charging stand 100 may be circular when viewed from above. FIG. 18A is a plan view of the charging stand 100 as viewed from above, and is a schematic view illustrating the charging stand 100 having a circular planar shape. In addition, FIG. 18B is a schematic view illustrating a cross section taken along a one-dot chain line III-III' in FIG. 18A.

As illustrated in FIG. 18A, a charging terminal 140 is provided at the center of the charging stand 100. In addition, around the charging terminal 140, a ring-shaped charging terminal 142 is provided on a concentric circle centering on the charging terminal 140. In addition, a ring-shaped positioning recess 144 is provided further outside the charging terminal 142. The positioning recess 144 is arranged concentrically with the charging terminal 142.

Figure 18B:
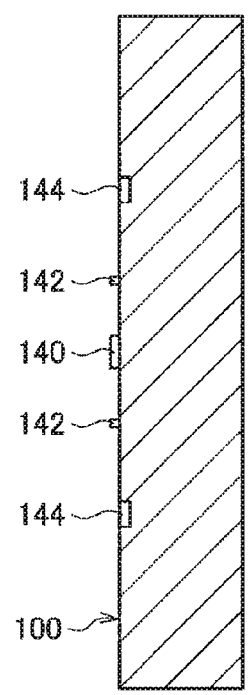
FIG. 18B is a schematic view illustrating a cross section taken along a one-dot chain line III-III' in FIG. 18A.
Figure 19A:
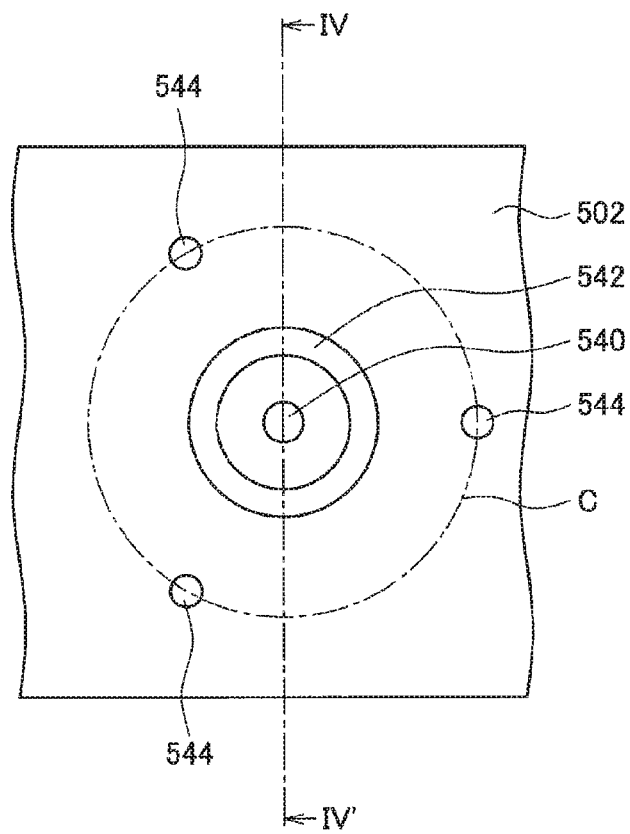
FIG. 19A is a schematic view illustrating a fitting surface 502 of the robot to be connected to the charging stand illustrated in FIGS. 18A and 18B.
Figure 19B:
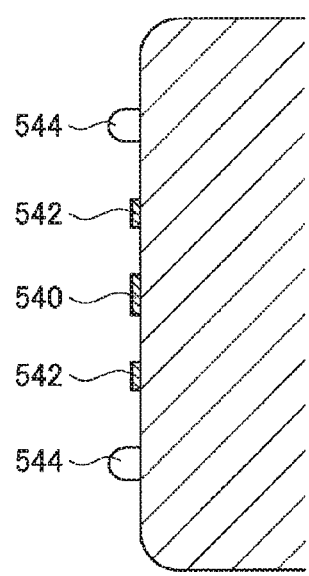
FIG. 19B is a schematic view illustrating the fitting surface 502 of the robot to be connected to the charging stand illustrated in FIGS. 18A and 18B.

FIGS. 19A and 19B are schematic views illustrating the fitting surface 502 of the robot 500 connected to the charging stand 100 illustrated in FIGS. 18A and 18B. FIG. 19A is a plan view illustrating the fitting surface 502. In addition, FIG. 19B is a schematic view illustrating a cross section taken along a one-dot chain line IV-IV' in FIG. 19A.

As illustrated in FIG. 19A, a charging terminal 540 is provided on the fitting surface 502 of the robot 500. In addition, around the charging terminal 540, a ring-shaped charging terminal 542 is provided on a concentric circle centering on the charging terminal 540. In addition, positioning protrusions 544 are provided further outside the charging terminal 542.

In FIG. 19A, a circle C passing through the three positioning protrusions 544 is arranged concentrically with the charging terminal 542. In addition, the diameter of the circle C is the same as the diameter of the ring-shaped positioning recess 144 illustrated in FIG. 18A. Thus, when the robot 500 sits down on the charging station 1000 and the fitting surface 502 is brought into close contact with the fitting surface 102, the three positioning protrusions 544 are fitted into the ring-shaped positioning recess 144. Then, when the positioning protrusions 544 are fitted into the ring-shaped positioning recess 144, the charging terminal 140 contacts the charging terminal 540, and the charging terminal 142 contacts the charging terminal 542. With this arrangement, the robot 500 and the charging stand 100 are electrically connected, so that the robot 500 can be charged.

As described above, the three positioning protrusions 544 on the robot 500 side enter the positioning recess 144 on the charging station 1000 side, and the positions of the charging station 1000 and the robot 500 are determined. The charging terminals are concentrically formed on both the charging station 1000 side and the robot 500 side, and the robot 500 can access the charging stand 100 from any direction within 360°. Note that, in the case of the charging stand 100 illustrated in FIG. 18A, it is preferable that the planar shape of charging mat 200 be also circular.

As described above, according to the present embodiment, when the robot 500 sits down, the position can be corrected on the charging stand 100 side. Thus, fine adjustment of the position on the robot 500 side is not required, and the robot 500 can sit down on the charging stand 100 for charging in a short time.

In addition, since the charging station 1000 includes the charging stand 100 and the charging mat 200, these can be combined and separated depending on a situation. At this time, since the robot 500 can be charged only by the charging stand 100, the charging stand 100 can be used as a portable charging stand.

By providing the charging mat 200, the power supply cord for supplying power can be covered, so that the power supply cord does not hinder the robot 500 in a case where the robot 500 accesses the charging stand 100. In addition, by providing the charging mat 200, conditions in the case where the robot 500 accesses the charging stand can be made constant.

In addition, even if the robot 500 interferes with the charging stand 100 during access to the charging stand 100, the charging stand 100 can move to retreat so as not to hinder the robot 500 from accessing the charging station 1000.

In addition, by providing the groove having the same shape as the shape of the bottom of the paw of the robot 500 along the edge of the charging mat 200, it is possible to prevent the paw of the robot from sliding off the mat. In addition, by providing the groove 246 having the same shape as the paw of the robot 500 along the edge of the charging mat 200, both the front paws of the robot 500 fit into the groove 246, and the robot 500 can be automatically directed toward the charging stand 100.

The preferred embodiments of the present disclosure have been described in detail above with reference to the accompanying drawings, but a technical scope of the present disclosure is not limited to such examples. It is obvious that a person having ordinary knowledge in the technical field of the present disclosure can conceive of various changes or modifications within the scope of the technical idea described in the claims, and as a matter of course, it is understood that the changes or the modifications also belongs to the technical scope of the present disclosure.

In addition, the effects described in the present specification are merely illustrative or exemplary and not limiting. That is, the technology according to the present disclosure can exhibit other effects that are apparent to those skilled in the art from the description of the present specification in addition to or instead of the above effects.

Note that the following configurations also belong to the technical scope of the present disclosure.

(1) A charging device including:
a charging stand having a charging terminal to be connected to a device to be charged and an engaging portion that performs positioning with the device to be charged; and
a support member that supports the charging stand movably in the horizontal direction.

(2) The charging device according to (1), further including a fitting surface provided with the charging terminal and the engaging portion, in which the fitting surface is fitted with a surface to be fitted provided on the device to be charged.

(3) The charging device according to (2), in which the fitting surface faces upward, and when the surface to be fitted of the device to be charged is lowered, the fitting surface and the surface to be fitted are fitted.

(4) The charging device according to (2), in which the fitting surface forms a concave surface facing upward, and the surface to be fitted forms a convex surface facing downward.

(5) The charging device according to (2), in which the engaging portion is a recess formed on the fitting surface, and a protrusion provided on the surface to be fitted is fitted into the engaging portion.

(6) The charging device according to (5), in which the charging terminal and a terminal of the device to be charged are electrically connected by fitting the engaging portion into the protrusion.

(7) The charging device according to (2), in which the engaging portion is provided at a lowermost portion of the fitting surface.

(8) The charging device according to any one of (1) to (7), in which the charging stand is attached to and detached from the support member.

(9) The charging device according to any one of (1) to (8), in which the support member covers a wiring connected to the charging stand.

(10) The charging device according to any one of (1) to (9), further including elastic members that support the charging stand movably in the horizontal direction with respect to the support member.

(11) The charging device according to (10), in which the elastic members are springs that pull the charging stand from four directions.

(12) The charging device according to any one of (1) to (11), in which the charging stand has a planar shape extending in a predetermined direction, and the device to be charged accesses the charging stand from the predetermined direction.

(13) The charging device according to any one of (1) to (12), in which
the support member is configured as a charging mat having a larger planar shape than a planar shape of the charging stand, and
the charging stand is provided to protrude from the upper surface of the charging mat.

(14) The charging device according to any one of (1) to (13), in which the device to be charged is a walking robot.

(15) The charging device according to (14), in which a groove corresponding to a shape of a paw of the robot is provided around the support member.

(16) The charging device according to (14), in which
the robot includes a camera that captures a surrounding image, and
the charging device is recognized by the robot on the basis of a shape and a color obtained from the image captured by the camera.

(17) The charging device according to (16), in which an approach direction of the robot to the charging stand is determined on the basis of a shape of the charging stand.

(18) The charging device according to (5), in which the engaging portion and the protrusion are fitted in accordance with movement of the device to be charged.

(19) A charging method in a charging device including
a charging stand having a charging terminal to be connected to a device to be charged and an engaging portion that performs positioning with the device to be charged, and
a support member that supports the charging stand movably in the horizontal direction,
the charging method including:
positioning the device to be charged on the charging stand; and
electrically connecting the charging terminal and a terminal of the device to be charged by lowering the device to be charged.

(20) A charging system including:
a movable device to be charged; and
a charging device including a charging stand having a charging terminal to be connected to a device to be charged and an engaging portion that performs positioning with the device to be charged, and a support member that supports the charging stand movably in the horizontal direction.

REFERENCE SIGNS LIST

100 Charging stand
102, 502 Fitting surface
104, 106, 108, 504, 506, 508 Charging terminal
112, 114 Positioning recess
200 Charging mat
234, 236, 238, 240 Spring
500 Robot
510 Paw
520 Camera
512, 514 Positioning protrusion

The invention claimed is:

1. A charging device, comprising:
a charging stand that includes:
a charging terminal configured to connect to a device to be charged; and
an engaging portion configured to position the device to be charged;
a support member configured to support the charging stand movably in a horizontal direction on a front surface of the support member; and
a plurality of elastic members on a back surface of the support member, wherein
the back surface is opposite to the front surface, and
the plurality of elastic members is configured to support the charging stand movably in the horizontal direction with respect to the support member.

2. The charging device according to claim 1, further comprising a fitting surface that includes the charging terminal and the engaging portion, wherein the fitting surface is fitted with a surface to be fitted of the device to be charged.

3. The charging device according to claim 2, wherein
the fitting surface faces upward, and
in a case where the surface to be fitted of the device to be charged is lowered to the fitting surface, the fitting surface is fitted to the surface to be fitted.

4. The charging device according to claim 2, wherein
the fitting surface has a concave surface that faces upward, and
the surface to be fitted has a convex surface that faces downward.

5. The charging device according to claim 2, wherein
the engaging portion is a recess on the fitting surface, and
a protrusion on the surface to be fitted is fitted into the engaging portion.

6. The charging device according to claim 5, wherein the charging terminal is configured to electrically connect to a terminal of the device to be charged in a case where the engaging portion is fitted into the protrusion.

7. The charging device according to claim 5, wherein the engaging portion is further configured to fit to the protrusion based on movement of the device to be charged.

8. The charging device according to claim 2, wherein a lowermost portion of the fitting surface includes the engaging portion.

9. The charging device according to claim 1, wherein the charging stand has a lower surface detachable from the front surface of the support member based on movement of the charging stand with respect to the support member.

10. The charging device according to claim 1, wherein the support member covers a wiring connected to the charging stand.

11. The charging device according to claim 1, wherein the elastic members of the plurality of elastic members are springs configured to pull the charging stand from four directions.

12. The charging device according to claim 1, wherein
the charging stand has a planar shape that extends in a determined direction, and
the charging stand is accessible to the device to be charged from the determined direction.

13. The charging device according to claim 1, wherein
the support member is configured as a charging mat having a planar shape larger than a planar shape of the charging stand, and
the charging stand protrudes from an upper surface of the charging mat.

14. The charging device according to claim 1, wherein the device to be charged is a walking robot.

15. The charging device according to claim 14, wherein
the support member includes a groove on a periphery of the support member, and
the groove corresponds to a shape of a paw of the walking robot.

16. The charging device according to claim 14, wherein
the walking robot includes a camera that captures a surrounding image, and
the charging device is recognized by the walking robot based on a shape of the charging stand and a color of the charging stand obtained from the surrounding image.

17. The charging device according to claim 16, wherein the walking robot determines an approach direction to the charging stand based on the shape of the charging stand.

18. A charging method, comprising:
in a charging device that includes:
a charging stand that includes:
a charging terminal configured to connect to a device to be charged, and
an engaging portion configured to position the device to be charged,
a support member configured to support the charging stand movably in a horizontal direction on a front surface of the support member, and
a plurality of elastic members on a back surface of the support member, wherein
the back surface is opposite to the front surface, and
the plurality of elastic members is configured to support the charging stand movably in the horizontal direction with respect to the support member:
positioning the device to be charged on the charging stand; and
electrically connecting the charging terminal and a terminal of the device to be charged by lowering the device to be charged.

19. A charging system, comprising:
a movable device configured to be charged; and
a charging device that includes a charging stand, wherein
the charging stand includes:
a charging terminal configured to connect to the movable device; and
an engaging portion configured to position the movable device;
a support member configured to support the charging stand movably in a horizontal direction on a front surface of the support member; and
a plurality of elastic members on a back surface of the support member, wherein
the back surface is opposite to the front surface, and
the plurality of elastic members is configured to support the charging stand movably in the horizontal direction with respect to the support member.

* * * * *